United States Patent
Böhm et al.

(10) Patent No.: US 6,783,174 B2
(45) Date of Patent: Aug. 31, 2004

(54) DRIVE DEVICE FOR A VEHICLE COMPONENT

(75) Inventors: Horst Böhm, Frankfurt am Main (DE); Rainer Grimm, Frankfurt am Main (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/446,990

(22) Filed: May 28, 2003

(65) Prior Publication Data

US 2003/0222483 A1 Dec. 4, 2003

(30) Foreign Application Priority Data

May 31, 2002 (DE) ......................................... 102 24 157

(51) Int. Cl.⁷ .............................................. B60J 7/057
(52) U.S. Cl. ................................................... 296/223
(58) Field of Search ........................... 296/223; 49/352

(56) References Cited

U.S. PATENT DOCUMENTS

| | | | | |
|---|---|---|---|---|
| 3,137,491 A | * | 6/1964 | Willem | ...................... 49/300 |
| 4,848,827 A | | 7/1989 | Ou | |
| 5,069,502 A | * | 12/1991 | Sekine et al. | ............... 296/223 |
| 5,657,580 A | * | 8/1997 | Kobrehel | ..................... 49/352 |
| 6,189,960 B1 | * | 2/2001 | Mumura et al. | ........... 296/212 |
| 6,643,979 B2 | * | 11/2003 | Schlatter | ..................... 49/352 |

FOREIGN PATENT DOCUMENTS

| | | | |
|---|---|---|---|
| DE | 2937121 | * | 4/1981 |
| DE | 101 23 420 A1 | | 12/2000 |
| EP | 0 982 165 A1 | | 3/2000 |
| WO | WO 01/49516 A1 | | 7/2001 |

OTHER PUBLICATIONS

Austrian Patent Office Search Report completed on Jul. 24, 2002.

* cited by examiner

Primary Examiner—Dennis H. Pedder
(74) Attorney, Agent, or Firm—Carlson, Gaskey & Olds

(57) ABSTRACT

A cable drive device for moving a vehicle component, such as a vehicle sliding roof, includes a cable that is guided in an endless loop and whose ends of which are wound up on two winding drums that are driven in the same direction. An intermediate section of the cable is looped around a further winding drum, thereby dividing the cable into two branches having entrainment elements provided thereon for engaging the vehicle component to be moved.

17 Claims, 5 Drawing Sheets

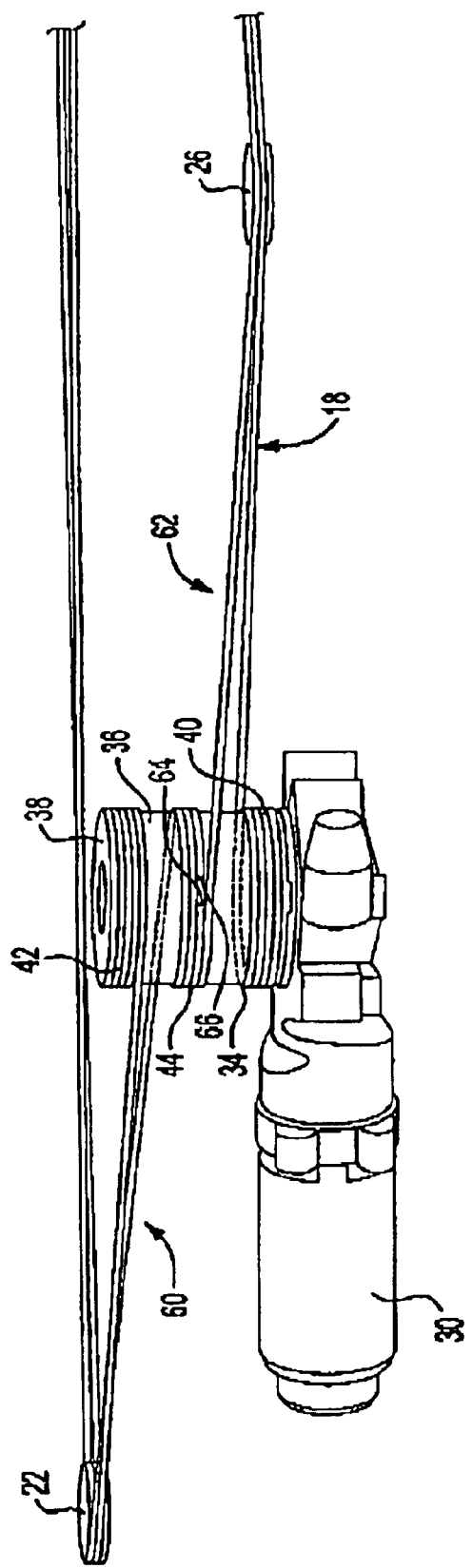

DRIVE DEVICE FOR A VEHICLE COMPONENT

REFERENCE TO RELATED APPLICATIONS

This application claims priority to German Patent Application No. 102 24 157 0, filed May 31, 2002.

TECHNICAL FIELD

The invention relates to a drive device, in particular a cable drive for a part secured to a vehicle and to be moved relative thereto.

BACKGROUND OF THE INVENTION

Drive devices, and cable drives in particular, are used to move a vehicle part (e.g., window, sliding roof, etc.) relative to a vehicle. Cable drives may comprise at least one flexible traction transfer means that is guided in the form of an endless loop and has two ends, each end having associated therewith a winding drum adapted to have the traction transfer means wound up on and unwound from it, a shared motor drive for rotating the winding drums in the same direction of rotation, and entrainment elements secured to the traction transfer means for connection with the part that is moved.

A drive device of this type for lifting and lowering a vehicle window pane is known, for example, from JP 62-15 34 80, DE 197 38 795 C1, or WO 00/35 695.

The principle of these drive devices resides in forming a pair of cable branches having parallel sections that each engage parallel lateral edges of the vehicle window and are moved up and down synchronously to avoid any tilting motion. The cable, which is guided via numerous deflection rollers, has a considerable cable length. This allows non-synchronous movements of the entrainment elements on the branches may occur, especially due to thermal expansion or wear or elongation of the cable. Although these differences in movement are very small, they may under some circumstances result in slight tilting motions or canted positions that should be avoided.

One object of the invention is to provide a drive device, in particular a cable drive for the cover of a vehicle sliding roof (including, of course, all other known types such as a folding roof, a rising roof or a sliding/tilting roof) in which the risk of non-synchronized movements of the entrainment elements is further reduced.

SUMMARY OF THE INVENTION

This object is achieved in a drive device for use in a vehicle. The drive device has at least one flexible traction transfer means that is guided in the form of an endless loop and has two ends, each end having an associated winding drum adapted to have the traction transfer means wound up on and unwound from it, a shared motor drive for rotating the winding drums in the same rotational direction, and entrainment elements secured to the traction transfer means for connection with the part that is moved.

The inventive drive device also has at least one further winding drum coupled with the drive. An intermediate section of the traction transfer means is looped around the at least one further winding drum between the ends so that at least two branches of the traction transfer means are formed between the winding drums and the further winding drum. The entrainment elements are fastened to the branches of the traction transfer means.

The further winding drum has a short, preferably central section of the traction transfer means wound up on it so that the free length of the traction transfer means, i.e., the length situated between two driven winding drums, is halved. The main reason why a synchronous driving motion is obtained using the further winding drum is because using only two winding drums causes the cable lengths between the entrainment elements and the wound-up ends to be unequal. If thermal expansion occurs, for example, this will result in a minor offset of the entrainment elements which may lead to canting of the part to be moved. Dividing the traction transfer means into two branches provides sections of the traction transfer means of equal length extending to the entrainment element in each branch, which makes any offset of the entrainment elements impossible. The expense for the further winding drum is not particularly great because it is moved by the same drive as the drive for the existing winding drums.

The invention provides a drive device that prevents the part to be moved from shifting into a canted position. This allows manufacturing tolerances of the components used in the invention to be larger, resulting in increased cost-effectiveness of the device.

BRIEF DESCRIPTION OF THE DRAWINGS

Further features and advantages of the invention will be apparent from the following description and from the following drawings to which reference is made and in which:

FIG. 5 is a side view of the drive showing the winding drums as part of the drive device according to another embodiment of the invention.

DETAILED DESCRIPTION OF THE EMBODIMENTS

Figure 1:
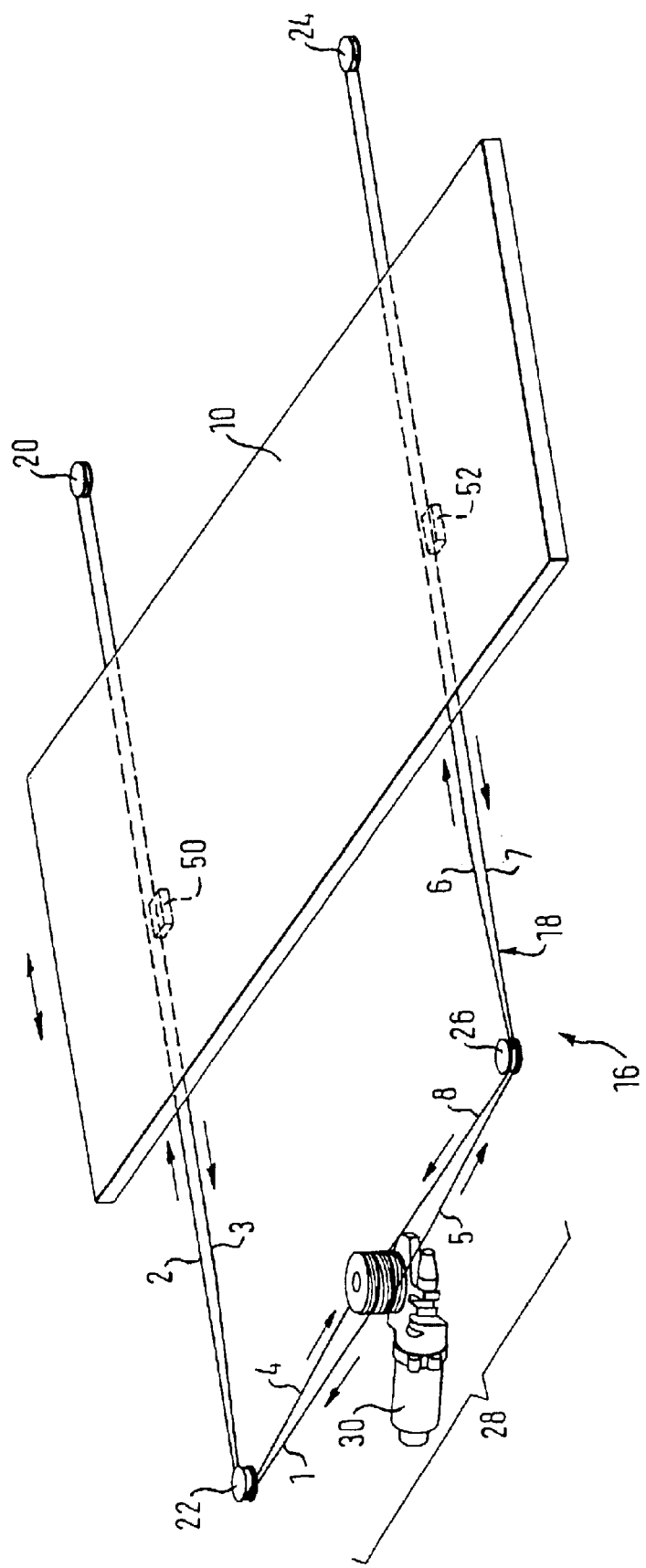
FIG. 1 is a simplified perspective view of a vehicle sliding roof and drive device according to one embodiment of the invention.

As noted above, the invention is generally directed to a drive device having at least one flexible traction transfer means that is guided in the form of an endless loop and having two ends, each end having associated therewith a winding drum adapted to have the traction transfer means wound up on and unwound from it, a shared motor drive for rotating the winding drums in the same direction of rotation, and entrainment elements secured to the traction transfer means for connection with the part that is being moved by the drive device.

The inventive drive device also has at least one further winding drum coupled with the drive. An intermediate section of the traction transfer means is looped around the at least one further winding drum between the ends so that between the winding drums and the further winding drum at least two branches of the traction transfer means are formed to which the entrainment elements are fastened.

The further winding drum has a short, preferably central section of the traction transfer means wound up on it so that the free length of the traction transfer means, i.e. that length which is situated between two driven winding drums, is halved. The main reason why a synchronous driving motion is obtained owing to the further winding drum is that with only two winding drums the cable lengths between the entrainment elements and the wound-up ends are unequal. In particular in the case of thermal expansions, this will result in a minor offset of the entrainment elements which may lead to canting of the part to be moved. Dividing the traction transfer means into two branches provides sections of equal length of the traction transfer means extending to the entrainment element in each branch, which makes any offset of the entrainment elements impossible.

The expense for the further winding drum is not particularly great because it is moved by the drive mechanism for the existing winding drums.

The invention provides a drive device in which the part to be moved by the drive device avoid shifting to a canted position, allowing the manufacturing tolerances of the components to be larger and therefore more cost-effective.

It should be understood that it is also possible for more than two branches to be formed by, for example, incorporating additional interconnected winding drums so that entrainment elements in more than two branches can also be driven synchronously.

The winding drums for the ends and the further winding drum are preferably arranged on the axis of rotation of the drive and hence positioned coaxially relative to each other as well to provide a compact design. In addition, starting from the ends, the traction transfer means is wound up on and unwound from the winding drums in opposite winding directions.

In the case of wear or when an expansion of the traction transfer means occurs, the traction transfer means has to be prevented from losing its pretension. For this reason, in the preferred embodiment at least one tensioning member is provided for permanent pretensioning of the traction transfer means.

In one embodiment, the tensioning member more particularly comprises a spring engaging the winding drums and biased to turn the winding drums in opposite directions to each other and in the wind-up directions assigned to the drums. This prevents cable slack from being produced when using a cable.

The further winding drum may be seated in the axial direction between the winding drums for receiving the ends.

While at least one flexible traction transfer means has been mentioned above, it should be understood that the invention is not limited to a device having one continuous traction transfer means. The traction transfer means may, for example, be separated in the middle, with the ends at the point of separation being fastened to the further winding drum and wound up thereon, thereby resulting in two traction transfer means. As a matter of course, more than two traction transfer means may also be used, in particular when additional further winding drums are provided.

A plurality of deflection rollers is provided for deflecting the traction transfer means in the area of the branches, defining at least a section of the traction transfer means, which is parallel to a corresponding section of the other branch. The entrainment elements are disposed in the region of the parallel sections.

In accordance with the preferred embodiment, the flexible traction transfer means is guided in the shape of an angular "U" to form an endless loop, where the entrainment elements are arranged on the legs of the "U" and the drive is arranged roughly in the middle of the connecting web of the "U".

The invention furthermore provides a vehicle sliding roof comprising a cover and a drive device in accordance with the invention, the entrainment elements of which engage the cover or, more generally, are coupled with the cover.

Although the described examples focus on a vehicle sliding roof, the drive device according to the invention may be used as a drive device for any vehicle component requiring movement (e.g., as a drive for the window panes of the vehicle).

Preferably, the traction transfer means is a flexible cable, but it would also be possible to use a strap, a cord, or other similar flexible structure as the traction transfer means.

Figure 2:
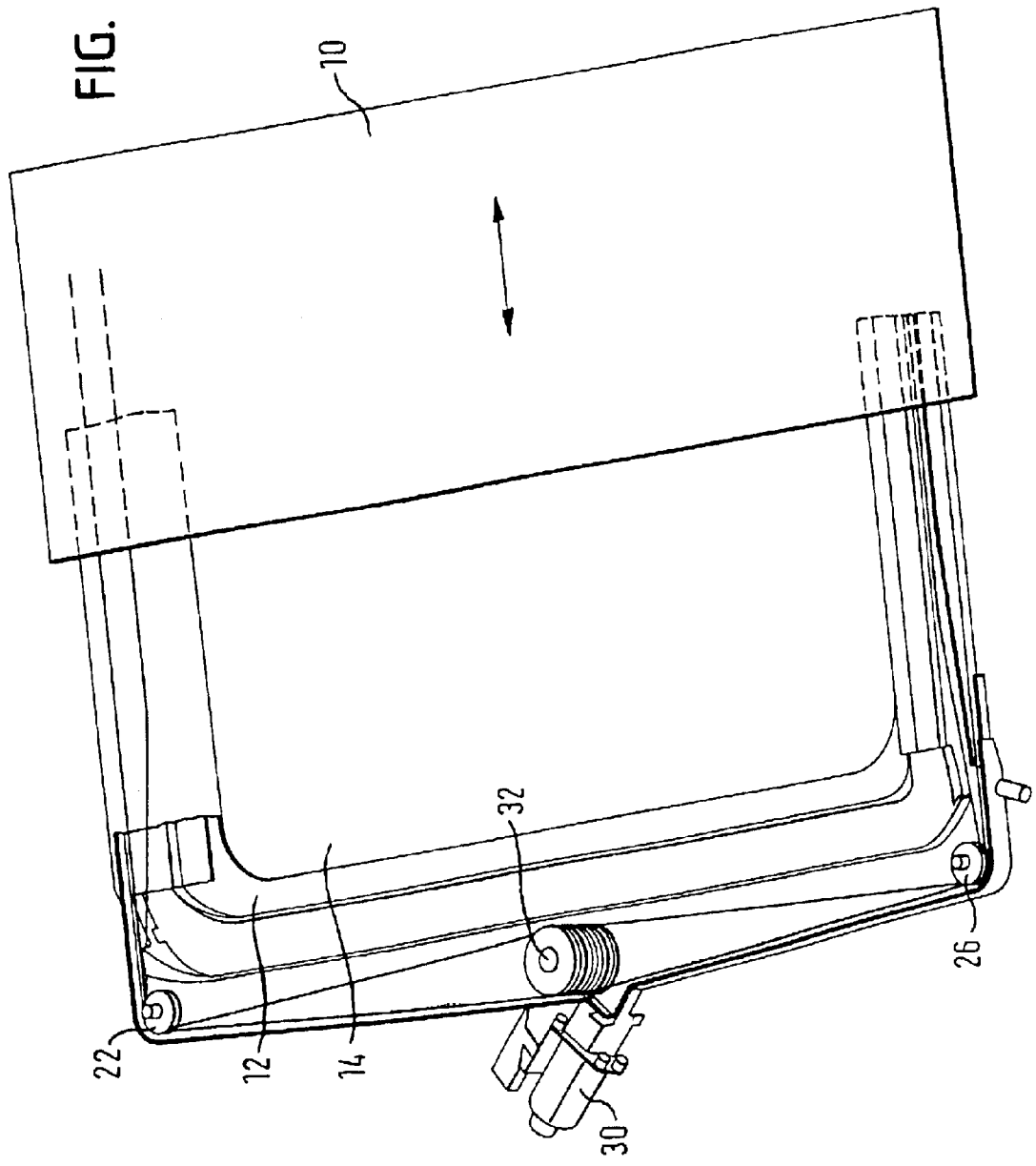
FIG. 2 is a top plan view of the front part, as viewed in the direction of travel, of the frame of the vehicle sliding roof and drive device according to one embodiment of the invention.

Examples of the inventive device will now be described with respect to the drawings. FIG. 1 is a simplified, representative illustration of a vehicle sliding roof having a cover 10 that is adapted to be shifted in the longitudinal direction of the vehicle. The cover 10 is preferably adapted to be tilted outwards. A frame 12 illustrated in FIG. 2 surrounds the roof opening 14, which is closed by the cover 10, and accommodates a drive device 16 which can likewise be seen in FIG. 1. The drive device, along with frame 12 and cover 10, may be supplied by an automotive supplier as a complete unit for installation in the vehicle.

The drive device is configured in the form of a cable drive.

A flexible traction transfer means in the form of a cable 18 runs in the shape of an angular "U" in an endless loop. The two parallel legs of the "U" extend parallel to the longitudinal direction of the vehicle and at the lateral edges of the cover 10 in the groove-shaped frame 12. The "U" is defined by deflection rollers 20, 22, 24 and 26 for the cable 18. As viewed in the longitudinal direction of the vehicle, the deflection rollers 20, 22 define the rear right-hand and front right-hand deflection rollers, whereas the deflection rollers 24, 26 define the rear left-hand and front left-hand deflection rollers. An electric motor drive 30 is positioned in the middle of the central part 28 of the "U". The electric motor drive 30 drives an upwardly directed drive shaft 32. Three winding drums are seated on the drive shaft 32 axially one on top of the other, namely a lower winding drum 34, a middle, or further, winding drum 36, and an upper winding drum 38. The winding drums 34, 38 are further connected to the drive shaft 32 to be non-rotational in relation thereto.

Figure 3:
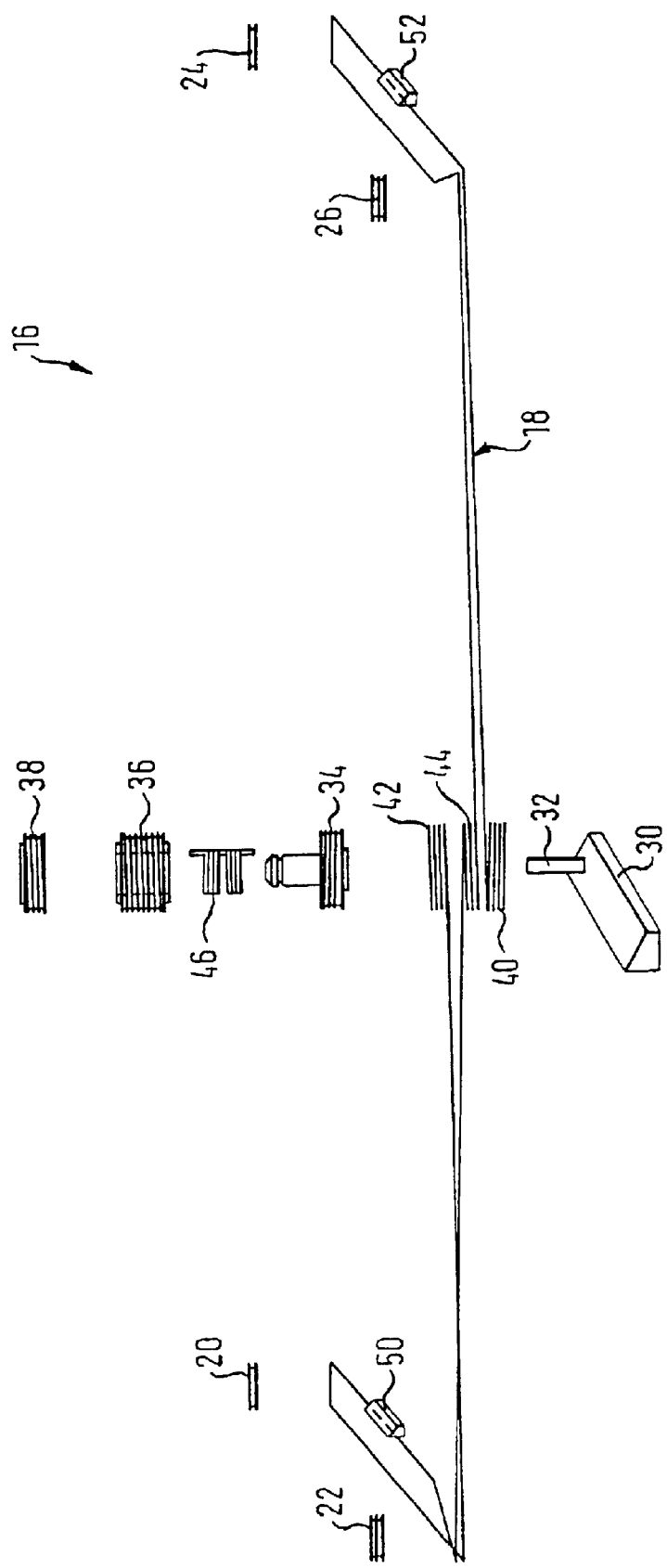
FIG. 3 is an exploded view of a part of the drive device according to the invention.
Figure 4:
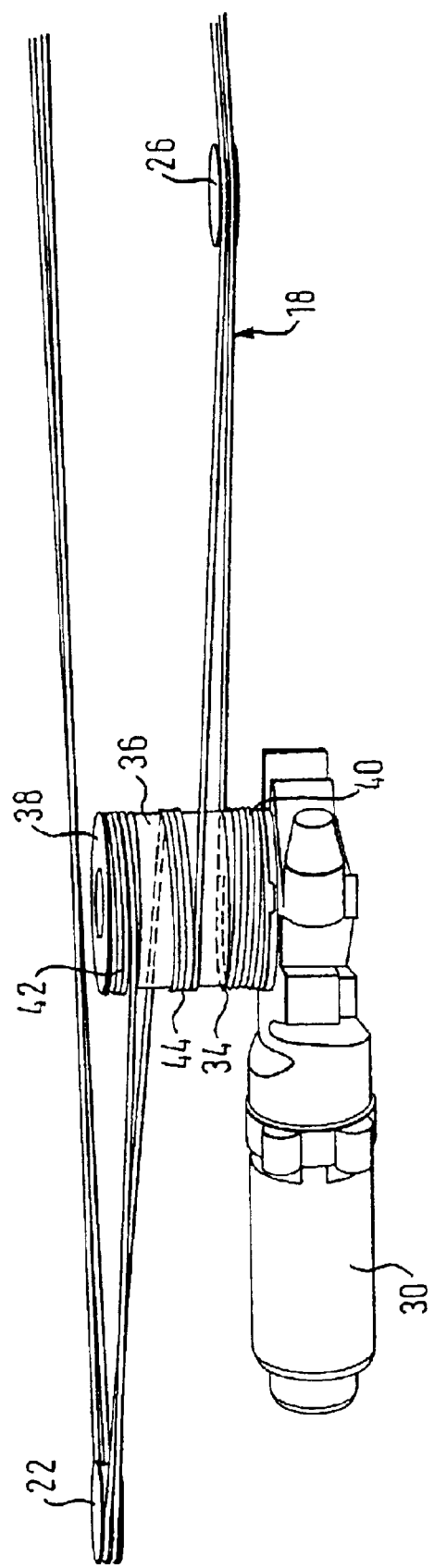
FIG. 4 is a side view of the drive showing the winding drums as part of the drive device according to the invention.

The cable 18 has two ends 40, 42, which are wound up in a plurality of turns on the lower winding drum 34 and the upper winding drum 38, respectively, such turns being visible in FIG. 3. In this arrangement, the ends 40, 42 are wound up on the associated winding drums 34, 38 in opposite directions (see FIGS. 2 and 4). An intermediate section 44, more precisely a short, central section of the cable 18, is looped around the central winding drum 36 in several turns and is additionally arrested thereon.

A tensioning member in the form of a spring 46 projects through the central winding drum 36 and engages both the central winding drum 36 and the lower winding drum 34, tending to turn the central winding drum 36 in its wind-up direction counter to the winding drums 34, 38 or, more generally speaking, to turn the winding drums 34, 36, 38 in opposite directions to each other and in their wind-up directions. The spring 46 provides permanent pretension of the cable 18. The spring further provides for the rotational entrainment of the central winding drum 36. Alternatively, the central winding drum 36 can be directly driven; in this case, the other winding drums 34, 38 would then be coupled with the drive via the spring 46.

The central winding drum 36 divides the cable 18 into two branches of equal length, more specifically a left-hand and a right-hand branch. The left-hand branch starts at the end 42 on the upper winding drum 38 and extends to the deflection roller 22. This section is designated by the reference numeral 1. The section 1 is followed by section 2, which extends from the deflection roller 22 to the deflection roller 20, followed by section 3 extending back to the deflection roller 22, and section 4 extending to the central winding drum. After several loops, section 5 is next, running to the deflection roller 26, followed by section 6, which extends to the deflection roller 24, section 7 running back to the deflection roller 26, and section 8 running to the end 40.

The sections 3 and 7 each have an entrainment element 50, 52 firmly secured to the cable 18, the entrainment elements 50, 52 being coupled with the underside of the cover 10 and defining the connection between the drive device and the cover 10. As can be seen from the arrows in FIG. 1, the sections 3, 7 and thus the entrainment elements 50, 52 move synchronously and in the same direction when the drive shaft 32 is rotated. In one rotational direction, the cover 10 is shifted to the rear and in the opposite rotational direction the cover 10 is shifted to the front. With reference to FIG. 1 it may also be readily seen that the division by the central winding drum 36 of the cable 18 into cable portions of equal length results in equal distances of the entrainment elements 50, 52 from their respective cable ends.

It is also possible to employ some other flexible traction transfer means in place of the cable 18, such as a strap, cord or other similar structure. In addition, it is also possible to provide a plurality of entrainment elements 50, 52 on each branch. Moreover, as shown in FIG. 5, the traction transfer means (e.g., the cable 18) may be separated in the middle to form two separate parts 60, 62 of the traction tranfer means. In this embodiment, ends 64, 66 of the first and second parts 60, 62 respectively, are fastened to the central winding drum 38. Thus, the cable forms two discrete traction transfer means rather than two branches of a single transfer means as in the previous embodiments.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A drive device for moving a vehicle component, comprising:
   at least one flexible traction transfer means that is guided in the form of a loop and has a first end and a second end;
   at least a first winding drum associated with the first end and a second winding drum associated with the second end, wherein the first and second winding drums are adapted to have the first and second ends of said at least one flexible traction transfer means wound up on and unwound from the first and second winding drums, respectively;
   a drive that rotates the first and second winding drums in a same rotational direction;
   at least one entrainment element secured to said at least one flexible traction transfer means and the vehicle component;
   at least one further winding drum coupled to the drive, wherein said at least one further winding drum is looped around by an intermediate section between the first and second ends of said at least one traction transfer means to form at least two branches of said at least one flexible traction transfer means,
   wherein said at least one entrainment element is fastened to one of said at least two said branches.

2. The drive device according to claim 1, wherein at least one of the first and second winding drums is seated on a drive shaft of the drive.

3. The drive device according to claim 1, further comprising at least one tensioning member that pretensions said at least one flexible traction transfer means.

4. The drive device according to claim 3, wherein said at least one tensioning member is a spring that engages at least one of the first and second winding drums and said at least one further winding drum, wherein the first and second winding drums have a first wind-up direction and said at least one further winding drum is biased in a direction opposite the first wind-up direction, biases at least one of the first and second winding drums and said at least one further winding drum in opposite directions.

5. The drive device according to claim 1, wherein said at least one further winding drum is seated in the axial direction between the first and second winding drums associated with the ends.

6. The drive device according to claim 1, wherein said at least one flexible traction transfer means comprises a first part having a first end fastened to and wound up on said at least one further winding drum and a second part having a second end fastened to and wound up on said at least one further winding drum, the first and second parts respectively forming first and second branches of said at least two branches of said at least one flexible traction transfer means.

7. The drive device according to claim 1, further comprising a plurality of deflection rollers that deflect said at least one flexible traction transfer means in an area of said at least one flexible traction transfer means defining at least a defined portion where said at least two branches are parallel to each other, wherein said at least one entrainment element is disposed in the defined portion.

8. The drive device according to claim 1, wherein said at least one flexible traction transfer means is substantially in the shape of an angular "U," wherein said at least one entrainment element is arranged on parallel legs of the "U," and wherein the drive is arranged substantially in a central part of the "U."

9. The drive device according to claim 1, wherein said at least one traction transfer means is wound up on and unwound from said first and second winding drums in opposite winding directions starting from the first and second ends.

10. A vehicle sliding roof, comprising:
    a cover; and
    a drive device having
    at least one flexible traction transfer means that is guided in the form of a loop and has a first end and a second end;
    at least a first winding drum associated with the first end and a second winding drum associated with the second end, wherein the first and second winding drums are adapted to have the first and second ends of said at least one flexible traction transfer means wound up on and unwound from the first and second winding drums, respectively;
    a drive that rotates the first and second winding drums in a same rotational direction;
    at least one entrainment element secured to said at least one flexible traction transfer means and the vehicle component;

at least one further winding drum coupled to the drive, wherein said at least one further winding drum is looped around by an intermediate section between the first and second ends of said at least one traction transfer means to form at least two branches of said at least one flexible traction transfer means, wherein said at least one entrainment element is fastened to one of said at least two branches and engages the cover.

11. The vehicle sliding roof according to claim 10, wherein at least one of the first and second winding drums is seated on a drive shaft of the drive.

12. The vehicle sliding roof according to claim 10, further comprising at least one tensioning member that pretensions said at least one flexible traction transfer means, wherein said at least one tensioning member is a spring that engages at least one of the first and second winding drums and the further winding drum, wherein said first and second winding drums have a first wind-up direction and said at least one further winding drum is biased in a direction opposite the first wind-up direction. biases at least one of the first and second winding drums and said at least one further winding drum in opposite directions.

13. The vehicle sliding roof according to claim 10, wherein said at least one flexible traction transfer means comprises a first part having a first end fastened to and wound up on said at least one further winding drum and a second part having a second end fastened to and wound up on said at least one further winding drum, the first and second parts respectively forming first and second branches in said at least two branches of said at least one flexible traction transfer means.

14. The vehicle sliding roof according to claim 10, further comprising a plurality of deflection rollers that deflect said at least one flexible traction transfer means in an area of said at least one flexible traction transfer means defining at least a portion where the first and second branches are parallel to each other, wherein said at least one entrainment element is disposed in the defined portion.

15. The vehicle sliding roof according to claim 10, wherein said at least one flexible traction transfer means is wound up on and unwound from said at least one winding drums in opposite winding directions starting from the first and second ends.

16. The drive device according to claim 1, wherein said at least one flexible traction transfer means is guided in the form of an endless loop.

17. The vehicle sliding roof according to claim 10, wherein said at least one flexible traction transfer means is guided in the form of an endless loop.

* * * * *